UNITED STATES PATENT OFFICE 2,636,887

ANTIOXIDANT FOR FATS AND FATTY OILS

Arthur W. Schwab and Herbert J. Dutton, Peoria, Ill., assignors to the United States of America as represented by the Secretary of Agriculture No Drawing. Application December 31, 1948, Serial No. 68,443

3 Claims. (Cl. 260—398.5)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the use of esters of certain aliphatic monocarboxylic acids and citric acid (2 - hydroxy - 1,2,3 - propane tricarboxylic acid), the ester linkage being effected between the carboxyl group of the monocarboxylic acid and the hydroxyl group of citric acid, as stabilizing agents against autoxidation and flavor deterioration in fats and fatty oils.

The esters used as the antioxidant are represented by the structural formula

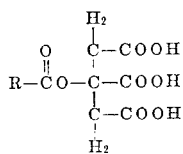

in which R is an aliphatic radical of at least 7 carbon atoms.

Citric acid is known as an effective stabilizer for fats and fatty oils. However, citric acid is not readily soluble in such fats and fatty oils, and the addition of citric acid to them is difficult.

The esters of the present invention are readily dissolved in fats and fatty oils and exhibit antioxidant and flavor preservative properties as effective as those of citric acid itself.

In general, according to the invention, these esters are produced by esterification of the hydroxyl group of citric acid by means of long chain aliphatic acyl halides.

The following specific examples illustrate preparation of two esters of the present invention. Parts given are by weight unless otherwise specified.

EXAMPLE I

*Beta-stearoxy tricarballylic acid*

Seven grams of stearoyl chloride and 5.0 grams of anhydrous citric acid were placed in a 500 cc. 3-neck flask fitted with a mechanical stirrer. The mixture was stirred for three days with gentle refluxing. The contents of the flask was then washed with a 5 percent solution of sodium carbonate, whereupon a heavy white precipitate formed. The mixture was filtered and the precipitate washed with distilled water. The precipitate was then transferred to a liter beaker and acidified with dilute hydrochloric acid, the mixture extracted with ethyl ether, the extract dried over anhydrous sodium sulfate, again filtered, and the ether removed under vacuum (M. P. 66–68° C.). The residue was dissolved in 100 cc. of chloroform, and the mixture filtered. The filtrate was then evaporated to dryness (M. P. 129.5–133.5). Upon recrystallization from absolute alcohol (M. P. 129–130), it was washed again with chloroform and filtered and dried (M. P. 131–133° C.). The product was a white crystalline solid, soluble in fats. Analysis: Calculated, C, 62.8; H, 9.17. Found, C, 61.6, 61.8, 61.3; H, 9.04, 9.28.

EXAMPLE II

*Beta-palmitoxy tricarballylic acid*

The procedure similar to that of Example I was followed, employing 17.90 g. of palmitoyl chloride, 13.83 g. anhydrous citric acid and 200 cc. anhydrous diethyl ether. After the reaction was complete, the ether was distilled off, and the white solid washed with distilled water and dried. The product was crystallized from ethanol (M. P. 122–126° C.) and recrystallized twice from absolute ethanol (M. P. 125–128° C.).

The product was a white crystalline solid, soluble in fats.

The esters of Examples I and II were dissolved in soybean oil (0.01% ester in each sample) and the resulting compositions subjected to drastic or accelerated storage and oxidation conditions together with control samples of a similar soybean oil without the esters for testing the effectiveness of the antioxidant properties. The results are shown in the following table, in which the phrase "A. O. M. conditions" refers to an active oxygen method consisting of blowing the sample with air at about 98° C.:

TABLE

| Sample | Treatment | Flavor Score | Peroxide Value |
|---|---|---|---|
| Oil+ester of Example I | Zero time | 7.8 | 0.18 |
| Control | | 8.0 | 0.10 |
| Oil+ester of Example I | 3 days' storage at 60° C. | 5.6 | 1.83 |
| Control | | 3.0 | 17.28 |
| Oil+ester of Example I | 8 hours under A. O. M. conditions. | ------ | 13.6 |
| Control | | ------ | 46.8 |
| Oil+ester of Example II | Zero time | 8.0 | 0.20 |
| Control | | 7.1 | 0.25 |
| Oil+ester of Example II | 3 days' storage at 60° C. | 6.3 | 1.27 |
| Control | | 3.8 | 11.67 |
| Oil+ester of Example II | 8 hours under A. O. M. conditions. | ------ | 21.8 |
| Control | | ------ | 60.0 |

In the above table, the flavor scores 3–4 indicate unpleasant, 5-6 indicate objectionable, and 7-8 indicate acceptable. The flavor evaluation of the compositions shows that the esters of Examples I and II have stabilization properties very closely similar to citric acid. The differences in flavor score between the treated samples and the untreated samples after storage for three days at 60° C. are significant. Moreover, the differences in the peroxide values after the accelerated storage and oxidation tests give further indication that the compositions are the approximate equal of such compounds as citric acid as stabilizers against autoxidation.

The amount of ester incorporated in fats and fatty oils to stabilize against autoxidation and flavor deterioration may vary from 0.3 to 0.001 by weight.

Having thus described the invention, what is claimed is:

1. Fats and oils having dissolved therein as an antioxidant an ester represented by the structural formula

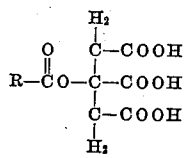

in which R is an aliphatic radical of at least seven carbon atoms.

2. Fats and fatty oils having beta-stearoxy tricarballylic acid dissolved therein as an antioxidant.

3. Fats and fatty oils having palmitoxy tricarballylic acid dissolved therein as an antioxidant.

ARTHUR W. SCHWAB.
HERBERT J. DUTTON.

References Cited in the file of this patent

UNITED STATES PATENTS

| Number | Name | Date |
|---|---|---|
| 2,025,984 | Harris | Dec. 31, 1935 |
| 2,122,716 | Graves | July 5, 1938 |
| 2,251,695 | Tucker | Aug. 5, 1941 |
| 2,266,591 | Eckey et al. | Dec. 16, 1941 |
| 2,485,632 | Vahlteich | Oct. 25, 1949 |